(12) United States Patent
Hanan

(10) Patent No.: US 7,967,169 B2
(45) Date of Patent: Jun. 28, 2011

(54) INTERNAL TOOTHPASTE TUBE DISPENSING DEVICE

(76) Inventor: Arie Hanan, Lapid (IL)

( * ) Notice: Subject to any disclaimer, the term of this patent is extended or adjusted under 35 U.S.C. 154(b) by 455 days.

(21) Appl. No.: 12/156,390

(22) Filed: Jun. 2, 2008

(65) Prior Publication Data

US 2009/0294474 A1 Dec. 3, 2009

(51) Int. Cl.
*B65D 35/00* (2006.01)
*B67D 7/60* (2010.01)

(52) U.S. Cl. ......... 222/107; 222/391; 222/206; 222/386

(58) Field of Classification Search ............... 222/107, 222/386, 105, 95, 92, 213, 214, 215, 206, 222/633, 96, 391
See application file for complete search history.

(56) References Cited

U.S. PATENT DOCUMENTS

| | | | | |
|---|---|---|---|---|
| 2,361,647 A | * | 10/1944 | Nyden | 222/214 |
| 3,201,003 A | * | 8/1965 | Wark et al. | 222/206 |
| 3,297,207 A | * | 1/1967 | Ballin | 222/107 |
| 3,493,147 A | * | 2/1970 | Ballin | 222/158 |
| 3,521,795 A | * | 7/1970 | Langhjelm et al. | 222/386 |
| 5,137,177 A | * | 8/1992 | Willis | 222/1 |
| 5,169,030 A | * | 12/1992 | Lewin | 222/92 |
| 5,622,288 A | * | 4/1997 | Boring | 222/327 |
| 2006/0289568 A1 | * | 12/2006 | Schang | 222/386 |

* cited by examiner

*Primary Examiner* — Kevin P Shaver
*Assistant Examiner* — Stephanie E Williams

(57) ABSTRACT

An improved device for dispensing toothpaste from a flexible tube using only manual pressure on the flexible tube. The device is formed to fit precisely the inner shape of the toothpaste tube and slides forward as the tube is manually squeezed from the outside. As the device moves toward the tube opening the toothpaste is expelled. Friction strips attached to the device on two sides come into contact with friction strips on the two interior sides of the toothpaste tube. As the device is propelled forward by manual pressure it is prevented from moving rearward toward the closed end of the toothpaste tube because of the friction strips. Thus as the tube is depressed and the toothpaste is expelled the flattened portion of the tube remains flattened and the tube is ready for the next use.

1 Claim, 4 Drawing Sheets

INTERNAL TOOTHPASTE TUBE DISPENSING DEVICE

CROSS REFERENCE TO RELATED APPLICATIONS

Not Applicable

FEDERALLY SPONSORED RESEARCH

Not Applicable

SEQUENCE LISTING OF PROGRAM

Not Applicable

BACKGROUND OF THE INVENTION

1. Field of Invention

This invention relates generally to toothpaste dispensers, and, more particularly to a device especially adapted to fit inside of a toothpaste tube that contains toothpaste and for dispensing the toothpaste from the flexible tube by manually squeezing the tube.

2. Prior Art

With the advent of collapsible toothpaste tubes as a method of dispensing toothpaste, people have searched for improved methods of squeezing paste from the tube.

Toothpaste is most commonly packaged in soft tubes, and toothpaste is commonly dispensed from a soft tube by a person manually squeezing the tube. Manual squeezing, however, is often inefficient. The middle of the tube is often squeezed, and a large, quantity of toothpaste may be squeezed away from the exit port of the soft tube rather than towards it. Therefore, there is always a quantity of toothpaste that is not squeezed out of the tube and therefore wasted no matter how the tube is squeezed or manipulated by the user. Also, when a tube is squeezed and resqueezed numerous times, the material comprising the tube often fatigues and may crack or rupture, thereby permitting toothpaste to be squeezed out from the cracks or ruptures.

Other products, other than toothpaste are sold in similar collapsible tubes. The users of these products have become aware that dispensing the product presents the same or similar problems as those presented by toothpaste tubes.

To overcome some of these problems associated with manually squeezing soft tubes to dispense toothpaste, inventors have developed a number of innovations relating to devices for squeezing the soft toothpaste tubes to dispense toothpaste.

A wide variety of both manually operable and powered devices for dispensing toothpaste and other substances from a collapsible tube are well known in the art. For example, U.S. Pat. No. 5,975,362 describes a pinch roller assembly that receives the toothpaste tube in a partially collapsed condition, and moves along the toothpaste tube and collapses a further portion thereof so as to pressurize the toothpaste therein and dispense the toothpaste out through the nozzle end U.S. Pat. No. 1,839,542 has a housing for receiving a tube of toothpaste and a key for rolling the tube of toothpaste to dispense toothpaste from the tube. U.S. Pat. No. 5,845,813 describes a motorized toothpaste dispenser that utilizes a sliding horizontal cylindrical wedge that presses a toothpaste tube against a fixed vertical planer wedge. The cylindrica wedge is moved by a line and pully system driven by a motor and spur gearing.

However, all of the known tooth paste dispensing devises utilize mechanisms for pinching or squeezing the toothpaste tube to collapse it, which mechanisms are observed to be too complex and/or too expensive to manufacture for widespread marketability. Furthermore, these devises all approach the problem by directing the pinching or squeezing mechanismisms to the outside of the tube.

OBJECTS AND ADVANTAGES

Accordingly, it is desirable to provide an improved tooth paste dispenser that more efficiently and easily dispenses toothpaste from a collapsible tube. The present invention also overcomes the perceived deficiencies in the prior art toothpaste dispensers and further achieves the aforementioned and below mentioned objectives.

It is an object of the present invention to provide a toothpaste dispensing device that operates exclusively on the inside of the collapsible tube.

It is a further object of the present invention to provide an internal toothpaste dispensing device which is inexpensive with only minimal moving parts.

It is a further object of the present invention to provide a toothpaste dispensing device that is integrated with an internally a part of the collapsible toothpaste tube.

It is a further object of the present invention to provide a device that can be utilized by merely pressing the tube from the outside by slightly pressing the tube between two fingers.

It is further object of the present invention to provide a device that is manually operated without the necessity of using external mechanical or electrical devices for squeezing the tube.

SUMMARY OF THE INVENTION

This new toothpaste dispensing device is innovative in that it assists with the expulsion of toothpaste from a collapsible tube without the necessity of utilizing mechanism comprised of multifacited moving parts of electrical devices. This invention consists of one solid device that conforms to the internal shape of a collapsible toothpaste tube and is inserted inside the tube. Friction strips are inserted on two sides of the interior of the tube to prevent the internal device from sliding back toward the rear of the tube. The friction strips are in constant contact with the internal device. When the tube is squeezed manually the device moves forward toward the open end of the tube causing the toothpaste to be expelled from the tube without any of the toothpaste returning to the emptied end of the tube.

The emptied end of the tube remains empty and the device remains in position ready for the next expulsion of toothpaste. When the device has moved forward toward the open end of the tube by the user having previously squeezed the tube by successive uses the tubes become completely and efficiently evacuated.

DETAILED DESCRIPTION OF PREFERRED EMBODIMENT

Figure 1:
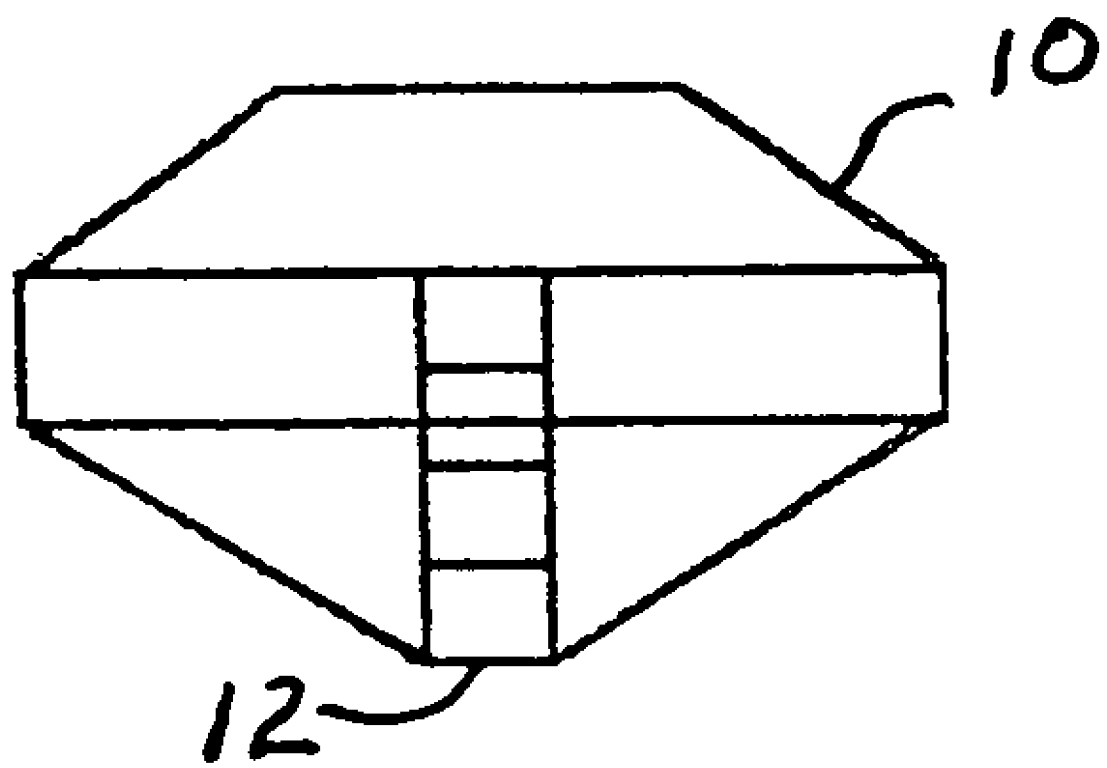
FIG. 1 is a side view of the dispensing device of the present invention.
Figure 2:
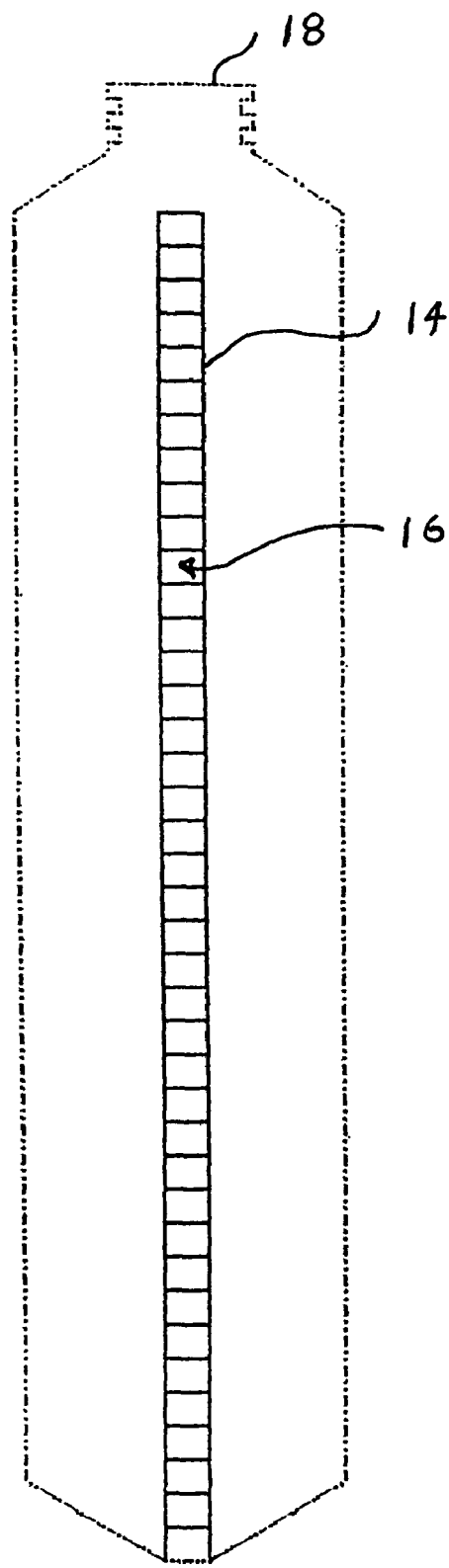
FIG. 2 is a side view of the interior of the flexible tube showing one of the grooved longitudinal frictional strips that are inside of the flexible tube and attached longitudinally to the interior of the tube.
Figure 3:
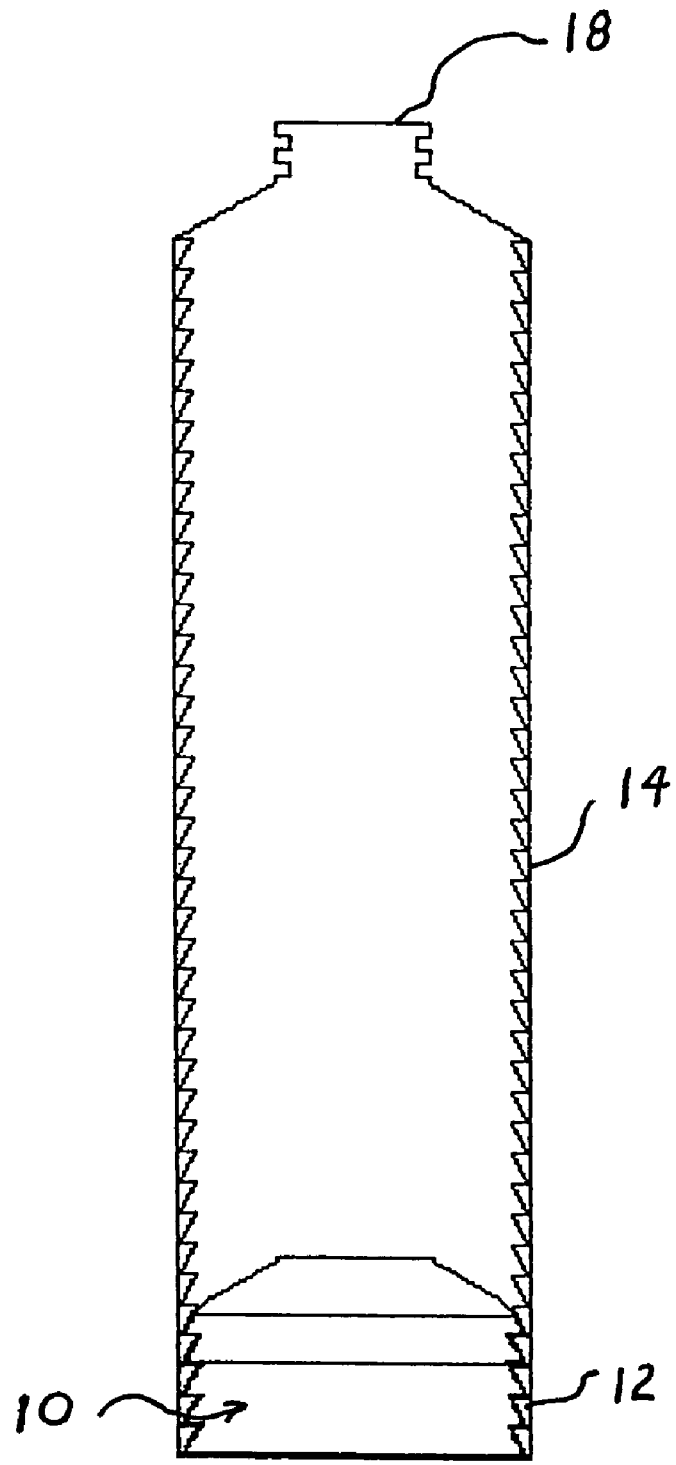
FIG. 3 is an interior view of the dispensing device, in place, showing the friction strips with the friction strips attached to the device making contact with the longitudinal frictional strips attached to the two interiors sides of the flexible tube.
Figure 4:
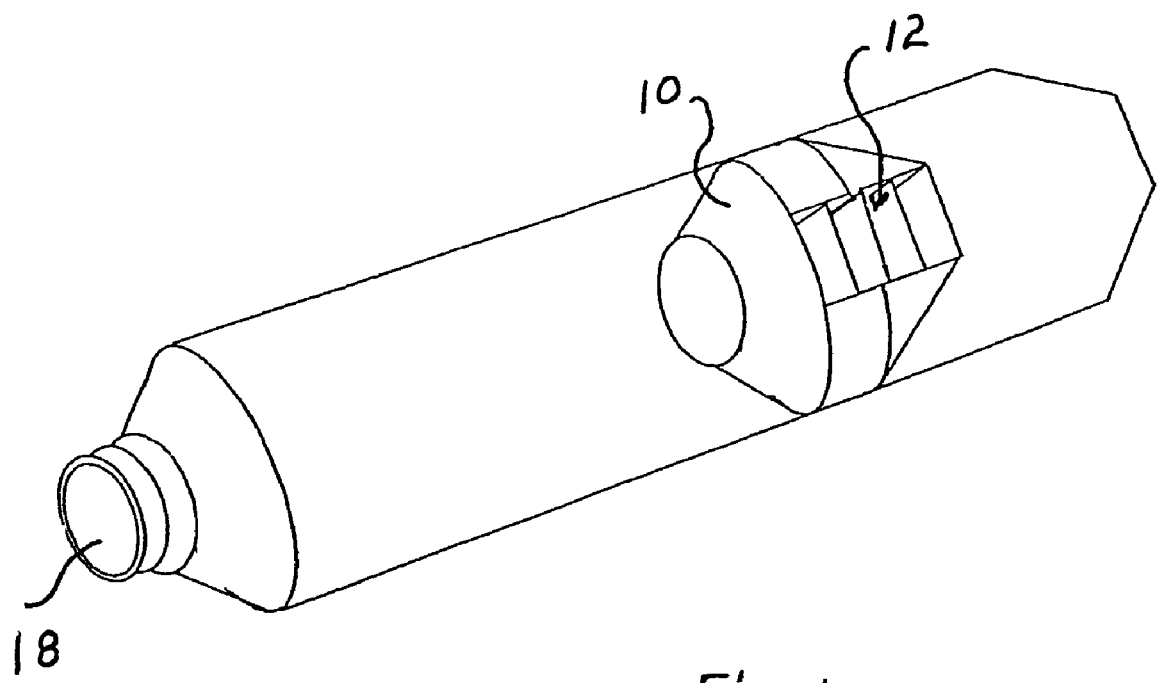
FIG. 4 is an interior view of the flexible tube with the dispensing device in place after the device has been propelled forward toward the tube opening.

A preferred embodiment of the toothpaste tube dispensing device of the present invention is illustrated in FIG. 1. The device 10 is hard plastic molded and formed to precisely fit inside the flexible tube so that the device is propelled forward from the rear of the tube to the opening of the tube by manually squeezing the tube. As the devise moves forward it displaces an amount of toothpaste which is expelled from the tube. The device has two longitudinal strips 12 composed of plastic and containing grooves or teeth to provide friction between the two sides of the flexible toothpaste tube. The flexible toothpaste illustrated in FIG. 2 tube has two longitudinal strips 14 composed of plastic and containing grooves or teeth 16 to provide friction between the longitudinal walls of the tube and the longitudinal sides of the device. The teeth are oriented to allow easy movement of the device toward the open end of the tube 18. However, the teeth are oriented to lock as illustrated in FIG. 3 should the device be attempted to be pushed toward the closed end of the tube. This locking of the friction strips will not allow the device to retract toward the closed end.

Operation—FIGS.

Use of the dispensing device is a simple and straight forward procedure. The dispenser as shown in FIG. 1 is installed in the flexible tube prior to its purchase and use by the consumer. The dispenser is installed internally inside of the flexible tube and positioned at the closed end of the tube opposite the open capped end of the tube. The friction strip as shown in the FIG. 2 is installed on both sides of the dispensing device so that the two friction strips make contact with the two friction strips as shown in FIG. 3 installed on the two interior sides of the flexible tube. The flexible tube contains the toothpaste that is inserted inside of the flexible tube between the device and the cap of the flexible tube.

When a quantity of toothpaste is desired, the user simply squeezes the tube at the rear point of the device. Squeezing the tube at the rear point of the device moves the device toward the open end of the tube causing the toothpaste to be dispensed out of the tube. The internal device will not return back toward the closed end and will thus be in position for the next use. With each succeeding use the internal device will slide forward closer to the open end of the tube until all of the tubes contents is pushed out from succeeding uses.

From the foregoing, it will be apparent that the present invention brings to the art a new and improved dispenser that by the simple and usual manual squeezing of the tube cleanly dispenses a quantity of toothpaste from a conventional tube. The internal device promotes efficient dispensing of the toothpaste without the necessity of rolling up the tube as is commonly done when using a conventional tube without the invention as shown.

The invention claimed is:

1. A toothpaste dispensing system, comprising a device especially adapted to fit and slide inside of a flexible tube adapted for containing toothpaste and having a nozzle end, and opposing sealed bottom end and opposing first and second sides extending between and connecting the nozzle end and the bottom end; and a pair friction strips containing grooves or teeth the strips being affixed to the full length of the two sides of the device and facing the first and second sides of the flexible tube; and a pair of friction strips containing grooves or teeth the strips being affixed to the full length of the first and second sides of the flexible tube; and the grooves or teeth are oriented so that when the flexible tube is manually squeezed the toothpaste is propelled out of the tube as the device easily moves forward toward the nozzle end; however, the opposing friction strips of the device and the first and second sides of the tube have grooves or teeth that interlock preventing the device from retracting toward the closed end when the tube is manually squeezed.

\* \* \* \* \*